US012344269B2

(12) United States Patent
Jayaraman et al.

(10) Patent No.: US 12,344,269 B2
(45) Date of Patent: Jul. 1, 2025

(54) COMPUTING SYSTEM FOR MITIGATING EXECUTION DRIFT

(71) Applicant: Intel Corporation, Santa Clara, CA (US)

(72) Inventors: Ramkumar Jayaraman, Bangalore (IN); Riccardo Mariani, Pisa (IT)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 17/131,461

(22) Filed: Dec. 22, 2020

(65) Prior Publication Data

US 2021/0107512 A1 Apr. 15, 2021

Related U.S. Application Data

(60) Provisional application No. 63/001,134, filed on Mar. 27, 2020.

(51) Int. Cl.
G07C 7/00 (2006.01)
B60W 60/00 (2020.01)
G06F 9/38 (2018.01)
G06F 9/50 (2006.01)
G07C 5/08 (2006.01)

(52) U.S. Cl.
CPC ......... *B60W 60/001* (2020.02); *G06F 9/3877* (2013.01); *G06F 9/3885* (2013.01); *G06F 9/5094* (2013.01); *G07C 5/0808* (2013.01)

(58) Field of Classification Search
CPC .. B60W 60/001; G06F 9/3877; G06F 9/3885; G06F 9/5094; G06F 2201/83; G06F 11/1687; G06F 2201/835; G06F 2201/84; G06F 9/4881; G06F 11/1641; G06F 9/4812; G06F 15/173; G06F 9/505; G07C 5/0808
See application file for complete search history.

(56) References Cited

U.S. PATENT DOCUMENTS

| | | | | |
|---|---|---|---|---|
| 5,295,258 A * | 3/1994 | Jewett | ...................... | G06F 11/20 714/E11.138 |
| 5,353,436 A * | 10/1994 | Horst | ..................... | G06F 11/184 713/375 |
| 5,613,128 A * | 3/1997 | Nizar | ..................... | G06F 15/17 710/266 |
| 9,880,953 B2 * | 1/2018 | Shajit | ..................... | G06F 9/4812 |
| 10,061,722 B2 * | 8/2018 | Hosseinipour | ...... | G06F 11/0787 |
| 10,394,728 B2 * | 8/2019 | Chew | ..................... | G06F 13/24 |

(Continued)

FOREIGN PATENT DOCUMENTS

WO 85/02698 A1 6/1985
WO WO85/02698 * 6/1985

OTHER PUBLICATIONS

European Search Report dated Aug. 10, 2021 for European Patent Application No. 21159411.4.

*Primary Examiner* — Ian Jen
(74) *Attorney, Agent, or Firm* — Banner & Witcoff Ltd.

(57) ABSTRACT

An apparatus comprising a first processor core to execute a first instance of an application; a second processor core to execute a second instance of the application concurrent with the execution of the first instance of the application; and processing circuitry to direct an interrupt to the first processor core based on an indication that an execution state of the first processor core is ahead of an execution state of the second processor core.

21 Claims, 9 Drawing Sheets

(56) References Cited

U.S. PATENT DOCUMENTS

| | | |
|---|---|---|
| 10,614,007 B2* | 4/2020 | Srinivas .................. G06F 9/544 |
| 2002/0116563 A1* | 8/2002 | Lever ...................... G06F 13/26 |
| | | 710/260 |
| 2006/0259621 A1* | 11/2006 | Ranganathan ..... H05K 7/20836 |
| | | 709/226 |
| 2011/0099146 A1* | 4/2011 | McAlister ........... G06F 11/2028 |
| | | 707/634 |
| 2011/0099420 A1* | 4/2011 | MacDonald McAlister ................ |
| | | G06F 11/1464 |
| | | 714/6.32 |
| 2012/0144081 A1* | 6/2012 | Smith .................. G06F 13/147 |
| | | 710/269 |
| 2012/0144172 A1* | 6/2012 | de Cesare ................ G06F 13/24 |
| | | 712/244 |
| 2015/0143142 A1* | 5/2015 | Park .................... G06F 9/44505 |
| | | 713/320 |
| 2016/0358300 A1* | 12/2016 | Taylor .................. G06F 9/5044 |
| 2017/0177518 A1* | 6/2017 | Chew .................. G06F 11/3466 |
| 2018/0046581 A1* | 2/2018 | Banerjee ............... G06F 3/0611 |
| 2019/0235448 A1* | 8/2019 | Banginwar ............. H04L 12/40 |
| 2020/0125397 A1* | 4/2020 | Wu ........................ G06F 9/4812 |
| 2020/0327637 A1* | 10/2020 | Vembu .................... G06F 9/223 |

\* cited by examiner

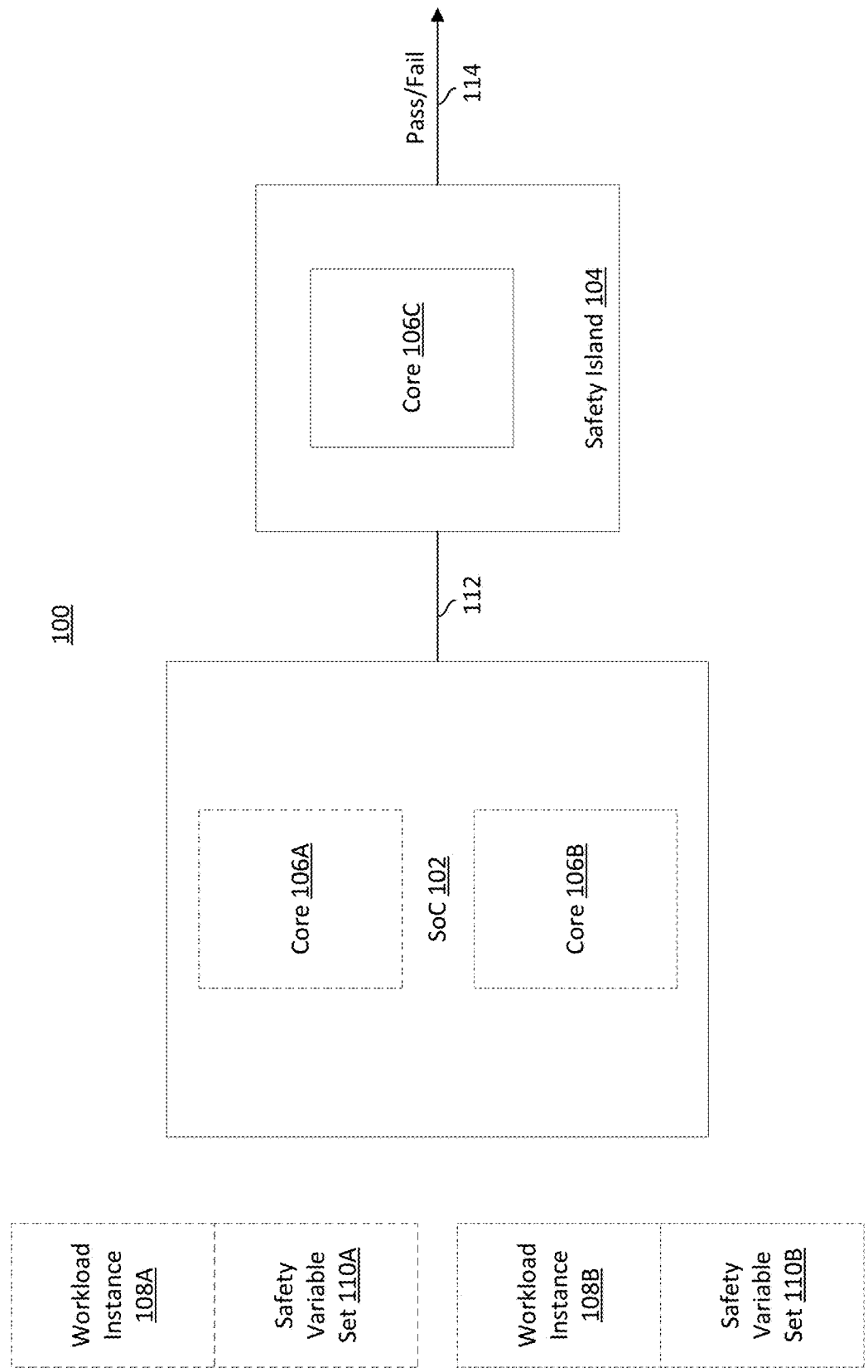

| Register Offset | Register Name | Register data fields |
|---|---|---|
| 0x00 | CONFIG_VALUE_0 | Contains details on whether this logic is enabled or not and the number of valid core entries in this table, if enabled. |
| 0x04 | DISPATCHER_CORE_ID_03_00 | First 4 core IDs to dispatch any interrupt |
| 0x08 | DISPATCHER_CORE_ID_07_04 | Next 4 core IDs to dispatch any interrupt |
| 0x0C | DISPATCHER_CORE_ID_0B_08 | Next 4 core IDs to dispatch any interrupt |
| 0x10 | DISPATCHER_CORE_ID_0F_0C | Next 4 core IDs to dispatch any interrupt |
| ... | ... | |
| 0x40 | WEIGHTS_CORE_ID_03_00 | Weights for the first 4 core IDs when dispatching interrupts |
| 0x44 | WEIGHTS_CORE_ID_07_04 | Weights for the first 4 core IDs when dispatching interrupts |
| ... | ... | |

| Register Offset | Register Name | Register Data | Description |
|---|---|---|---|
| 0x00 | CONFIG_VALUE_0 | 0x8000_0002 | Feature is enabled and first 2 CPU core IDs are valid. |
| 0x04 | DISPATCHER_CORE_ID_03_00 | 0x0000_0300 | Dispatch first interrupt to Core 0 followed by Core 3 |
| 0x08 | DISPATCHER_CORE_ID_07_04 | 0x0000_0000 | Not applicable |
| 0x0C | DISPATCHER_CORE_ID_0B_08 | 0x0000_0000 | Not applicable |
| 0x10 | DISPATCHER_CORE_ID_0F_0C | 0x0000_0x00 | Not applicable |
| ... | ... | | |
| 0x40 | WEIGHTS_CORE_ID_03_00 | 0x0000_0101 | Weights are equally distributed amongst Core 0 and Core 3 dispatch. |
| 0x44 | WEIGHTS_CORE_ID_07_04 | 0x0000_0000 | Not applicable |
| ... | ... | | |

COMPUTING SYSTEM FOR MITIGATING EXECUTION DRIFT

CROSS REFERENCE TO RELATED APPLICATIONS

This patent application claims the benefit of and priority to U.S. Provisional Application No. 63/001,134, filed Mar. 27, 2020, which is incorporated herein by reference in its entirety.

BACKGROUND

Field

This disclosure relates in general to the field of computing systems and, more particularly, to computing systems mitigating execution drift.

Related Art

Computing platforms used, such as used in in automotive (e.g. automatous or automated driving, advance driver assistance systems (ADAS)) and industrial Internet of Things (IOT) systems utilize built-in error diagnostics and error correction capabilities to uncover and recover from random hardware failures occurring in hardware elements such as central processing unit (CPU) cores, memories, and interconnects. On-demand cross comparison (ODCC) is a software based redundancy technique which increases the diagnostic coverage (DC) by executing two independent instances of a safety application (also referred to as "workload pair") on two different physical processor cores and comparing the state of safety variables periodically such that any mismatch in state variables are detected within a process safety time (PST) interval (e.g., a period of time between a failure occurring in a process or process control system and the occurrence of a hazardous event if the safety function is not performed). This technique is also known as variable patrolling and comparison.

BRIEF DESCRIPTION OF THE DRAWINGS

FIG. 1 depicts a system for hosting a workload pair according to exemplary aspects.

FIG. 5 depicts an example programming interface for directing interrupts to leading processor cores according to exemplary aspects.

FIG. 6 depicts an example configuration of registers for directing interrupts to leading processor cores according to exemplary aspects.

Figure 2A:
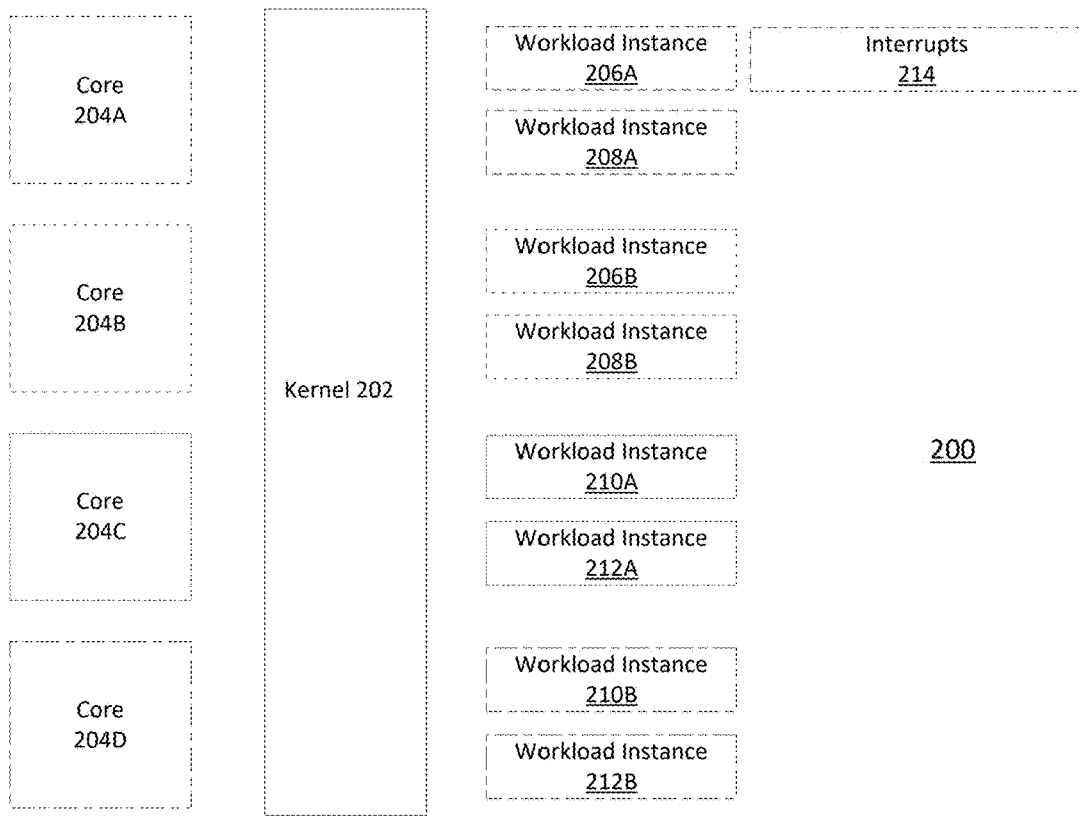
FIGS. 2A and 2B depicts example mappings of workload pairs and interrupt handlers to processor cores according to exemplary aspects.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

DETAILED DESCRIPTION

FIG. 1 depicts a system 100 for hosting a workload pair in accordance with certain aspects. In a particular aspect, system 100 is a variable patrolling functional safety system, although the concepts described herein may be utilized to control execution drift in any suitable computing environment hosting any suitable computing applications (e.g., collection of executable code). System 100 includes a System-on-chip (SoC) 102 coupled to a safety island 104. The SoC 102 includes two processor cores 106A and 106B and safety island includes processor core 106C. The SoC 102 and the safety island 104 are coupled via interconnect 112, which may be an on-chip system fabric, Peripheral Component Interconnect express (PCIe), Controller Area Network (CAN) Bus, or any other wired or wireless interconnect. The safety island 104 may be implemented as an integrated solution, in which the safety island is integrated within a chipset or even within the processor (e.g., SoC 102). The safety island 104 may alternatively be implemented as a discrete off-chip solution, e.g., in form of a PCIe add-on card or as an Application Specific Integrated Circuit (ASIC), a Field Programmable Gate Array (FPGA), or other logical arrangement. In another aspect, the safety island 104 may be implemented in another core 106 of the SoC 102 or within one of the cores 106A or 106B. In this aspect, the SoC 102 is configured to provide additional safety requirements, such as an independent clock and/or voltage sources.

Core 106A executes a first workload instance 108A and core 106B executes a second workload instance 108B. The first workload instance 108A is an instance of an application and the second workload instance 108B is a second (redundant) instance of the same application that is executed concurrently with the first instance. The execution of the first workload instance 108A may begin at or very close to the start of the execution of the second workload instance 108B.

Workload instance 108A is associated with safety variable set 110A comprising one or more variables that are updated based on results of the execution of the workload instance 108A and/or the state of hardware (e.g., core 106A, memory, other hardware) associated with the execution of the workload instance 108A (e.g., either hardware used to execute the workload instance or hardware that is acted upon during execution of the workload instance, such as one or more robots or other devices controlled by execution of the workload instance 108A). Similarly, workload instance 108B is associated with safety variable set 110B. Under ideal conditions, the values of the variables of the safety variable set 110A will match the values of the variables of the safety variable set 110B as time progresses. Differences in such variables may signal problems with the execution of the workload instances.

Execution drift describes a situation where execution of one workload instance is advanced in time relative to execution of a corresponding workload instance due to more processing cycles (e.g., of a processor core) being used to execute the workload instance relative to the number of processing cycles (e.g. of a different processor core) being used to execute the lagging workload instance. Execution drift may present a problem as it may hinder or deny the safety island the ability to perform a timely comparison of values of safety variables of the leading workload instance and the values of the safety variables of the lagging workload instance. This may result in the safety island 104 erroneously failing to signal a problem (e.g., via pass/fail signal 114 generated by safety island 104 which compares the safety variable set 110A with safety variable set 110B) that could result in undesirable remedial action being taken (e.g., shutting down of the system).

Variable patrolling and comparison systems may be susceptible to continual increase of the execution drifts between the individual instances of a workload pair or group (e.g., two or more instances of a safety application or other application). Over an extended period (which could be days or months depending on the scenario), this execution drift keeps accumulating and can exceed a process safety time (PST) interval, which leads to a safety goal violation. The major contributor to execution drift between workload pairs is asynchronous events (e.g., interrupts).

Particular systems may mitigate the execution drift issue by operating the CPU cores at the same working point (e.g., same voltage and same frequency). This facilitates determinism in execution across the two physical cores. In addition, one or more dedicated cores may be allocated to handle asynchronous events such as interrupts and exceptions. This allows the execution drift between the workload pairs to be kept at a minimal amount. However, use of dedicated CPU cores to execute an asynchronous event handler result in a lesser number of CPU cores available for the execution of safety workloads/applications. For instance, in a 4-core CPU design, if one core is allocated to service all interrupts, only two cores are available for execution of the safety workloads/applications (since safety applications are run on CPU pairs). This problem becomes worse in platform designs using virtualized environments, since up to one core per virtual machine (VM) will be required for execution of interrupts. This reduces the overall number of CPU cores available for execution of safety workloads/applications.

Figure 2B:
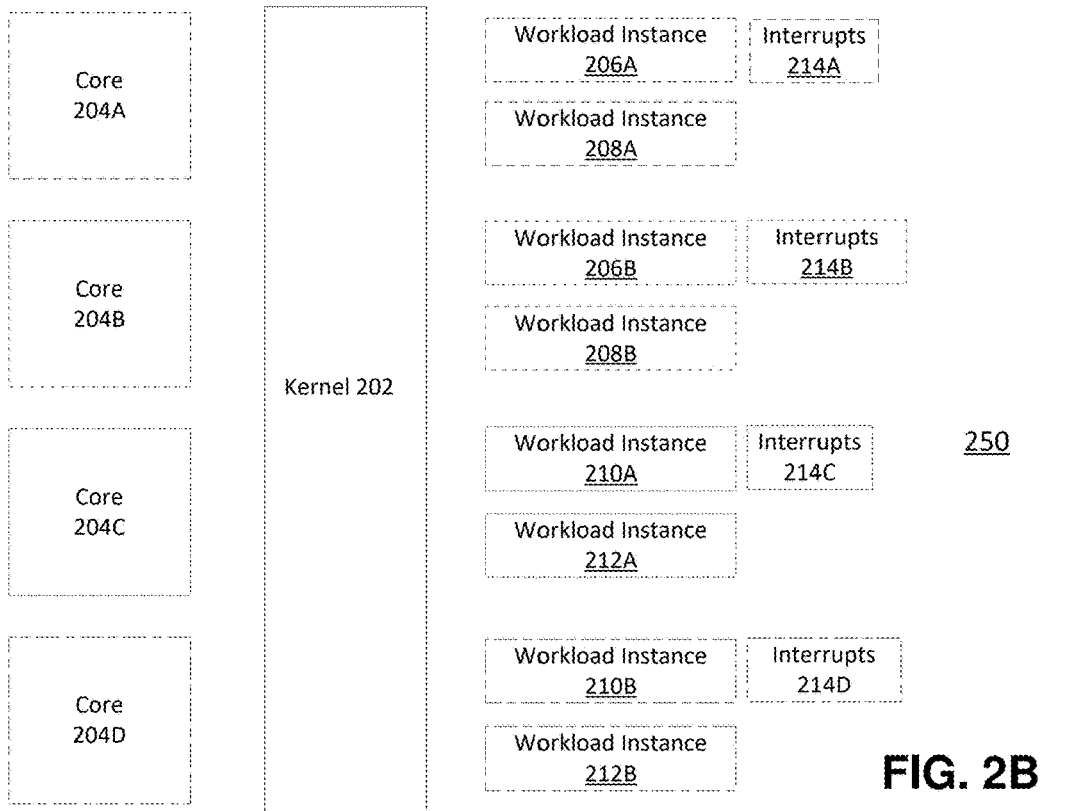

FIGS. 2A and 2B depict example mappings 200 and 250 of workload pairs and interrupt handlers to processor cores in accordance with certain aspects. Both FIGS. 2A and 2B are based on non-virtualized environments which do not host virtual machines. Both mappings depict a kernel 202 that facilitates execution of interrupts by one or more of the processor cores 204A-D. In the mapping 200 of FIG. 2A, core 204A is allocated to service all interrupts (e.g., from input/output (I/O) peripherals) occurring in the system in addition to executing workload instances 206A and 208A (where 206A is a first instance of a first application and 208A is a first instance of a second application that is different from the first application). Core 204B executes workload instances 206B and 208B (where 206B is a second instance of the first application and 208B is a second instance of the second application). This arrangement may cause the workload instances 206A and 208A to lag behind the workload instances 206B and 208B (and thus core 204A may lag behind core 204B). Because neither core 204C nor 204D service interrupts, there may be no lag observed between cores 204C and 204D and no lag among the workload pairs executed by these cores (e.g., 210A and 210B, 212A and 212B).

In FIG. 2B, all of the cores 204A-204D share the interrupts. Interrupts have various characteristics which may make it difficult to determine a priori how to distribute the interrupts among processors. As one example, the time to service an interrupt may vary across different I/O peripherals. For instance, an Ethernet peripheral might need more CPU cycles to service an interrupt than an I2C peripheral. As another example, even with the same I/O peripheral, the time taken to execute the interrupt service routine is not constant but may vary due to different events causing that interrupt. For instance, an Ethernet controller might consume more CPU cycles to service a receive event than a transmit complete event. As yet another example, even with the same events, the time taken to execute the interrupt service routine varies with run-time parameters such as size of payload, state of hardware queues, available memory buffers, etc. For instance, if the interrupt service routine need to copy the payload data from hardware buffer to main memory, the time taken by a core (e.g., 204a) to copy a few KBs of data will be greater than the time taken to copy a payload data of a few bytes. Thus, the CPU cycles required (and time taken to execute) to service an interrupt is not constant and cannot be deduced a priori due to its run-time dependencies. Thus, solutions based on static association of interrupts to a given set of CPU cores may have limitations with respect to execution drifts between workload pairs. Such solutions may be inefficient due to design choices made based on worst-case scenarios or may lead to safety goal violations.

Returning to FIG. 2B, the relative size of interrupts 214A-D represent the respective cycles used by the respective core (204A-204D) to service the interrupts sent to the respective cores. For example, core 204B utilizes the most cycles to service interrupts, core 204D utilizes the next most cycles to service interrupts, core 204A utilizes the next most cycles to service interrupts, and core 204C utilizes the least amount of cycles to service interrupts. Accordingly, core 204B (and the instances 206B and 208B executed by core 204B) will lag behind core 204A (and the instances 206A and 208A executed by core 204A). Similarly, core 204D (and the instances 210B and 212B executed by core 204B) will lag behind core 204C (and the instances 210A and 212A executed by core 204A).

Various aspects of the present disclosure provide systems and methods to control or reduce the execution drift between workload pairs. As described above, execution drift is caused when a processor core lags from its paired processor core during workload execution. It is generally not practical to speed-up the lagging processing core. However, it is feasible to slow the leading processor core by re-directing asynchronous events (and related overhead) to the leading processor core. By dynamically controlling this re-direction process (e.g., varying the processor cores to which asynchronous events are dispatched), it is possible to reduce and/or control the execution drift. Various aspects of the present disclosure provide the ability to avoid allocation of dedicated CPU cores for handling asynchronous events, which may enable efficient utilization of CPU cores for the execution of different safety workloads/applications and thus reduce overall system costs.

Figure 3:
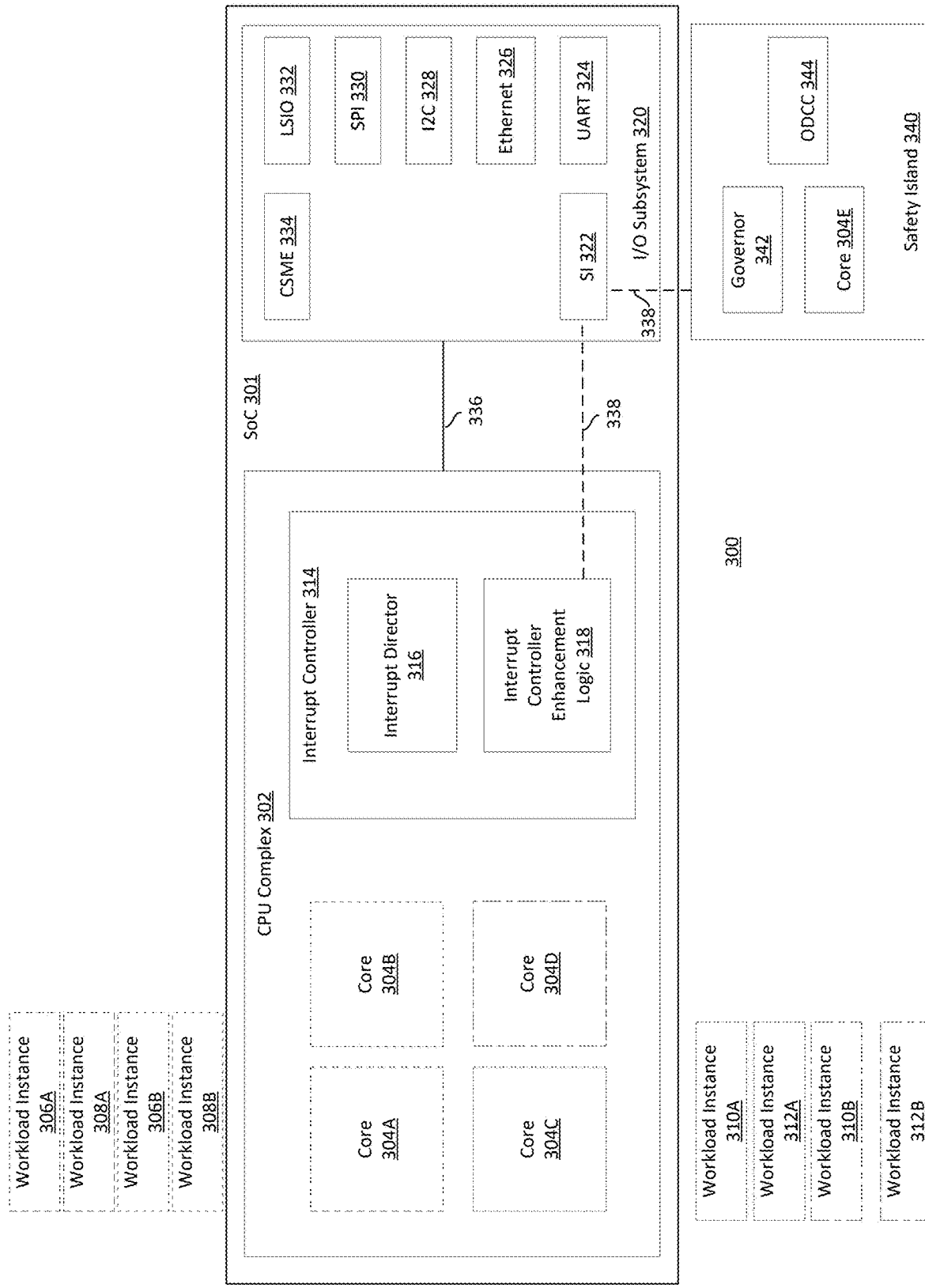
FIG. 3 depicts a system to direct interrupts to leading processor cores according to exemplary aspects.

FIG. 3 depicts a system 300 to direct interrupts to leading processor cores in accordance with certain aspects. System 300 includes an SoC 301 coupled to a safety island 340. In various aspects, the safety island 340 may be located on a different integrated circuit chip than the SoC 301. In other aspects, the safety island 340 may be integrated on the SoC 301. In yet other aspects, other logic located on the SoC (or other processor comprising cores such as 304A-D) or coupled to the SoC may perform the functions of the safety island 340. Safety island 340 may include one or more cores 304E to execute software to implement safety island functionality. In an exemplary aspect, the safety island 340 may be integrated on SoC 301 or a part of SoC 301, or one or more cores of the SoC 301 can be configured as the safety island 340 (e.g. the operating system (OS) and system firmware can be configured accordingly to exclude the particular core(s) of the SoC 301 from computing purposes. In an exemplary aspect, a virtual machine (VM) may be built using a particular number of cores to perform safety island functionalities.

In this aspect, SoC includes a CPU complex 302 which includes four processor cores 304A-D, an interrupt controller 314, and an I/O subsystem 320 which may include various I/O peripherals 322-334 which may generate interrupts or otherwise communicate with the CPU complex 302. Core 304A executes workload instances 306A and 308A, while core 304B executes duplicated workload instances 306B and 308B. Similarly, core 304C executes workload instances 310A and 312A while core 304D executes duplicated workload instances 310B and 312B. Core 304A and core 304B form a paired CPU core set while core 304C and core 304D form another paired CPU core set. The number of cores 304 is not limited to four cores and the number of cores can be less or more (e.g. 8 cores, 16 cores) as would be understood by one of ordinary skill in the art. Similarly, the any number of safety workloads can be used based on the system design and processor performance.

In various aspects, each instance of a safety application or workload (e.g., 306A and B, 308A and B, 310A and B, and 312A and B) (or logic associated with the application or workload) computes the signatures of its safety variables (similar to 110A and 110B) at specific points of execution of the application. The periodicity of such computation could be, e.g., between a few milliseconds and a few hours, or other time periods as determined by the particular use case. Signatures of the safety variable sets may be computed using cyclic redundancy check (CRC)-32 or any other hashing or signature evaluation algorithm. A signature (or a collection of the variables themselves) of a particular workload instance may then be included in or otherwise associated with a snapshot that also includes or is associated with other details such as a processor core ID of the core executing the workload instance, a workload ID (uniquely identifying the application being executed), a snapshot ID (an identifier for the particular snapshot, in some aspects, the snapshot ID increases sequentially from one snapshot to the next snapshot), type details, and timestamp (an exact time at which the safety variables that form the basis for the snapshot were captured). This collection of data may be referred to as an ODCC snapshot. The timer subsystem which provides the timestamps for the snapshots may be synchronized across different cores in the SoC 301 by using, e.g., a time keeping service of the SoC. In an alternative aspect, the set of safety variables may be exchanged directly instead of a corresponding signatures/hashes. In an exemplary aspect where the set of safety variables include analog variables (e.g. voltages, currents, temperatures, and/or other sensor output values), the comparison is based on one or more tolerance values (+/− value or a percentage value) instead of a direct comparison. For example, two sensors measuring the same physical parameter may report different values (e.g. 5.23 versus 5.22) that are nonetheless considered to be equal. A direct comparison would indicate this as a failure, but a tolerance-based comparison allows the appropriate range of difference in comparison.

In some aspects, the snapshots may be accumulated across all of the workload instances and stored (e.g., in the host (e.g., SoC 301) either as part of the workloads, a driver, or in a global store). In some aspects, the accumulated snapshots may then be transferred to memory of safety island 340 using direct memory access (DMA) or other suitable transfer procedure over interconnect 336. In other aspects, the ODCC snapshots may be sent individually from each workload instance to the memory of the safety island 340 without accumulation across workloads. Such aspects may be particularly desirable in implementations with smaller PST intervals (e.g., 1 mS).

The safety island 340 compares ODCC snapshots and may take a system to a safe state (e.g., by disengaging actuators of a system so a robot controlled by the workload stops moving, by sounding an alarm, by notifying an entity that intervention required, by powering down a system, adjusting an ADAS route to cause the autonomous vehicle to make a navigational change such as moving the autonomous vehicle to a safe lane on the road, etc.) in the case of comparison failures (e.g., when signatures for snapshots of different instances of the same workload do not match for a particular snapshot ID) or snapshot mismatches/misses (e.g., when the snapshot ID of the instances being compared is unexpected, e.g., when a snapshot ID skips forward by a large amount). In various aspects, On-demand cross comparison (ODCC) module 344 performs these comparison, checking, and remediation functions.

In an exemplary aspect, the safety island 340 includes a governor 342, which comprises logic (e.g., hardware or software executed as part of the safety island 340's firmware) configured to determine which cores 304 are leading and lagging in the system. In an exemplary aspect, the logic is hardware or software executed as part of the safety island 340's firmware. In some aspects, the governor 342 may be in communication with the ODCC module 344 (e.g., in the safety island 340's firmware) or may be part of the ODCC module itself.

In an exemplary aspect, SoC 301 alternatively includes the governor 342. In this aspect, the safety island 340 may be integrated on SoC 301 or a part of SoC 301, or one or more cores of the SoC 301 can be configured as the safety island 340 (e.g. the operating system (OS) and system firmware can be configured accordingly to exclude the particular core(s) of the SoC 301 from computing purposes. In an alternative aspect, the governor 342 is integrated on SoC 301 or a part of SoC 301, or one or more cores of the SoC 301 can be configured as the governor 342, while the safety island 340 remains an external component as illustrated in FIG. 3.

In another aspect, the governor 342 includes multiple components and these components cooperatively operate to perform the functions of the governor 342. These components may be distributed across both the SoC 301 and the external safety island 340. In this example, the components of the governor 342 may be integrated in one or more of the cores 304 of the SoC 301 and/or safety island 340.

As a workload executes, the safety island 340 via governor 342 (or other suitable logic of system 300) calculates the execution drift between the workload pairs by using the timestamp field of the snapshots. For example, the governor 342 may calculate execution drifts between one or more core-pairs at the receipt of an ODCC snapshot, at expiry of a PST, or at any other pre-defined interval. In an exemplary aspect, the pre-defined interval is less than the PST, where the pre-defined interval may be significantly less than the PST.

As an example of execution drift, a snapshot for workload instance 306A with snapshot ID=1 may have a timestamp of t=10 and a snapshot for workload instance 306B with snapshot ID=1 may have a timestamp of t=11, which would indicate that workload instance 306B (and core 304B) is lagging. However, if the timestamps of the snapshots had been equal, then no lag would have been found.

In some aspects, the execution drift for a given CPU core pair may be calculated from the execution drifts of the associated workload pairs. For example, the governor 342 may calculate execution drifts by summing up individual execution drifts of workload instances associated with the cores. For instance, the execution drift between core-pair (a-b), which includes hypothetical core "a" and core "b" may be defined as:

Execution drift between core-pair (a-b)=Σ (Timestamp in ODCC snapshot of workload instance $P_i$ executed by core "a"–Timestamp in ODCC snapshot of $P_i'$ executed by core "b")

where the summation is performed over all of the workload pairs being executed by the cores of the core-pair (a-b).

Similarly, the execution drift between a core-pair (c-d), which includes hypothetical core "c" and core "d" is defined as:

Execution drift between core-pair (c-d)=Σ (Timestamp in ODCC snapshot of workload $P_i$ executed by core "c"– Timestamp in ODCC snapshot of $P_i'$ executed by core "d")

where the summation is performed over all of the workload pairs being executed by the cores of the core-pair (c-d).

The governor 342 may communicate the execution drift(s) or information derived therefrom (e.g., which cores are leading and/or lagging, an extent to which such cores are leading and/or lagging, one or more weights for any of such cores, etc.) to an interrupt controller 314 of the SoC 301. In some aspects, the safety island 340 may piggy-back the ordered set of leading cores and weights to the ICEL 318 using other safety island-to-host communication packets.

In another exemplary aspect, the governor 343 is alternatively integrated on SoC 301 or a part of SoC 301, or one or more cores of the SoC 301 can be configured as the safety island 340 (e.g. the OS and system firmware can be configured accordingly to exclude the particular core(s) of the SoC 301 from computing purposes). In this example, the OS and/or system firmware may be configured to interact with the interrupt controller 314 to instruct the interrupt controller 314 directly without the intervention of the externally-located safety island 340.

As explained below, such communications may allow the interrupt controller 314 to direct incoming interrupts to the leading cores such that the execution drifts between the workload pairs can be controlled by slowing down the leading cores. That is, the leading processor cores may be allocated to service more interrupts than the lagging processor cores. This allows the lagging processor cores to catch up to (or even pass) the leading processor cores. In other aspects, the governor 342 may communicate the execution drift(s) or information derived therefrom to any other suitable entity (e.g., a computing system associated with a customer using the SoC 301 to run the workload instances), which may then use the execution drifts to program the interrupt controller 314 to direct more interrupts to the leading processor cores.

In the aspect depicted, interrupt controller 314 comprises an interrupt director 316 and interrupt controller enhancement logic (ICEL) 318. During normal operation (e.g., when not correcting for leading and lagging cores), the interrupt director 316 receives interrupt requests from, e.g., I/O peripherals (e.g., Universal Asynchronous Receiver/Transmitter (UART) 324, Ethernet 326, Inter-integrated Circuit (I2C) 328, Serial Peripheral Interface (SPI) 330, Low Speed I/O (LSIO) 332, or Converged Security and Management Engine (CSME) 334) and assigns processing of an interrupt to one of the cores 304A-D. The interrupt director 316 may assign processor cores to interrupts in any suitable manner.

Figure 4:
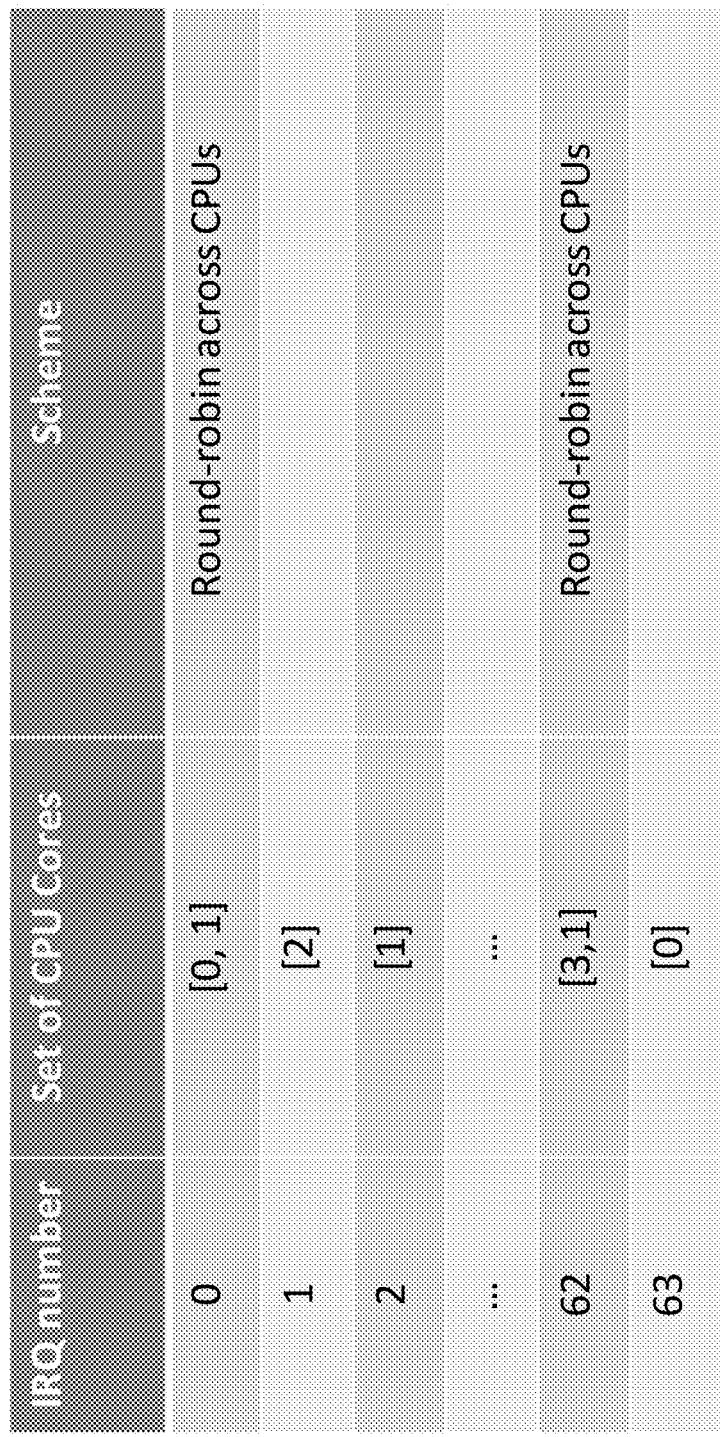
FIG. 4 depicts a conceptual interrupt vector programming table according to exemplary aspects.

FIG. 4 depicts a conceptual interrupt vector programming table 400 in accordance with certain aspects. Table 400 represents one example method that may be used by interrupt director 316 to assign processor cores to interrupts. Interrupt director 316 may include the ability to dispatch interrupts of a particular type to a set of one or more processor cores based on a configured policy such as static mapping, round-robin scheme, etc. In the aspect depicted, core 0 may correspond to core 304A, core 1 may correspond to core 304B, core 2 may correspond to core 304C, core 3 may correspond to core 304D as an example. IRQ 0 is dispatched to core 0 and core 1 in a round-robin manner. Similarly, IRQ 62 is dispatched to CPU3 and CPU1 in a round-robin manner. Other IRQs such as IRQ1, IRQ2 and IRQ63 are statically assigned to a single processor core (2, 1, and 0 respectively). In one example, each IRQ may be assigned to a particular entity that may generate interrupts. For example, CSME 334 may be assigned a particular IRQ (e.g., IRQ0), LSIO 332 may be assigned to IRQ1, SPI 330 may be assigned to IRQ2, and so on. When an interrupt is requested, the interrupt controller may contact the assigned core and the core may execute an interrupt handler. In various aspects, the operating system or kernel may register a handling routine for each IRQ such that the core may execute the appropriate code when a particular interrupt is generated.

Returning again to FIG. 3, the ICEL 318 may be operable to override the processor core assignment for an interrupt to assign the interrupt to a different processor core. In one example, the interrupt director 316 may communicate the assigned processor core to the ICEL and the ICEL determines whether the assigned core is one of the lagging cores. If the assigned core is a lagging core, the assignment made by the interrupt director 316 is ignored, and the ICEL 318 assigns a leading core to the interrupt. In one example, if the core assigned by the interrupt director 316 is not a lagging core, the ICEL 318 may allow the assignment to stand.

In some aspects, the ICEL 318 may assign leading cores to interrupts based on weights associated with each leading core. Thus, if a particular leading core is assigned to a higher weight, it will receive a larger percentage of the interrupts that would normally be assigned to lagging cores than would another leading core with a lower weight. The weights may be assigned at any suitable granularity. For example, the weights may be assigned per core for all IRQs, or the weights may be assigned per core per each individual IRQ, or using any other suitable granularity.

In various aspects, the ICEL 318 may utilize configuration registers that store values indicating whether interrupt redirection is enabled, which cores are leading cores, and/or weights associated with the leading cores. The ICEL 318 may expose its registers to the safety island 340 through interconnect 336 (e.g., via a virtual channel 338). This virtual channel may be provided over register access vendor defined messages (RAVDM), Peripheral Component Interconnect Express (PCIe), or any other suitable communication mechanism.

FIG. 5 depicts an example programming interface 500 for directing interrupts to leading processor cores in accordance with certain aspects. The register map is not limited to the illustrated example and may be defined based on convenience and performance related aspects, as would be understood by one of ordinary skill in the art.

The example programming interface 500 may be exposed by the ICEL 318 to the safety island 340 or other logic in accordance with certain aspects. In FIG. 5, the Dispatcher Core IDs is an ordered set of processor cores to which interrupts are directed. These IDs may include thread IDs in case of hyper threaded systems. Specified weights may provide the relative distribution of interrupts to the cores. The safety island 340 thus has two mechanisms (specification of one or more leading cores and specification of weights for the one or more leading cores) to distribute and re-order the interrupts from the I/O-subsystem 320 to the cores. In various aspects, weights may be assigned (e.g., by a customer associated with the workload instances, by governor 342 according to logic of the governor 342, or by other suitable computing entity) based on the relative lead amounts of the processor cores (e.g., processor cores which are leading by a large amount may be assigned higher weights).

FIG. 6 depicts an example configuration of registers 600 for directing interrupts to leading processor cores in accordance with certain aspects. FIG. 6 illustrates an example configuration of registers of the ICEL 318 to address a situation in which core 0 leads core 1 and core 3 leads core 2. In this example, the safety island 340 has programmed the registers 600 of the ICEL 318 to enable its logic and to redirect interrupts to core 0 and core 3 (which are leading their partner cores, core 1 and core 2 respectively). Also, the weights of distribution of interrupts to core 0 and core 3 is set as 1:1 so that these cores will receive an equal percentage of redirected interrupts.

Figure 7:
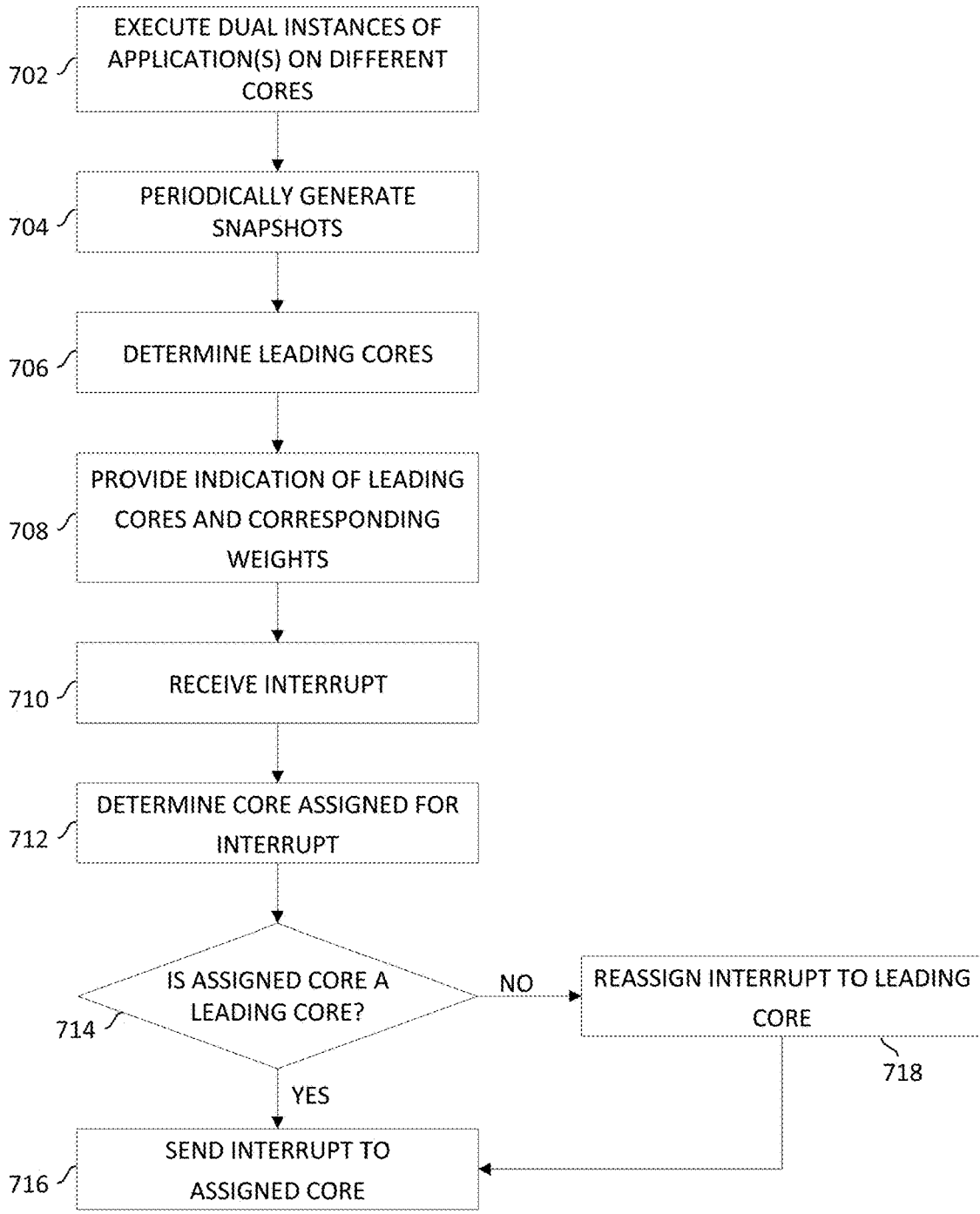
FIG. 7 depicts an example flow for directing interrupts to leading processor cores according to exemplary aspects.

FIG. 7 depicts an example flow 700 for directing interrupts to leading processor cores in accordance with certain aspects. At 702, dual (e.g., redundant) instances of one or more applications are executed on different processor cores. At 704, snapshots of variables associated with the application instances are generated. At 706, a determination is made as to which processor cores (if any) are leading their respective paired processor cores. The determination may be made based on the snapshots, including timestamps associated with the snapshots.

At 708, an indication of one or more leading cores and (optionally) corresponding weights associated with the leading cores are provided by any suitable computing entity. At 710, an interrupt is received. At 712, a processing core assigned to the interrupt is determined. At 714 a determination is made as to whether the assigned core is a leading core. If the assigned core is a leading core, the interrupt is sent to the assigned core for processing at 716. If the assigned core is not a leading core, the interrupt is reassigned to a leading core at 718 and then is sent to the newly assigned core at 716. The assignment may be based on the indication of leading cores and corresponding weights provided at 708. In some aspects, performance of 714 may be conditioned upon enablement of reassignment logic (e.g., ICEL 318).

In general, the functionality described herein may be implemented by any suitable entities described herein. For example, in some aspects, the ordered set of leading cores and weights may be evaluated and programmed by the processor cores (that execute the workload instances) themselves based on ODCC snapshots generated in the CPU Complex 302 instead of offloading such evaluation to the safety island 340 or other logical entity. In an exemplary aspect, the weights are initially adjusted to provide a fine-grain control and subsequently adjust the redirection list of interrupts to bring the execution drift close to zero.

Although exemplary aspects may be described with a particular number of CPU cores, the present disclosure is not limited thereto. For example, the aspects may be extended to any number of N cores with the N workloads being duplicated to run on N cores. For example, the aspects may be applied to three cores with triplicate workloads. In this example, the safety island and its governor (or the governor within the SoC in aspects with the SoC-based governor) are configured to identify two cores which are leading the third core. The interrupts are then re-directed accordingly. The weights can advantageously be used to address the multiple-core configurations. For example, the weights can be set to a higher value to address leading most core while the next leading core can use a lower-valued weighting. Advantageously the two leading cores can be slowed to allow the third, lagging core to catch up.

Figure 8:
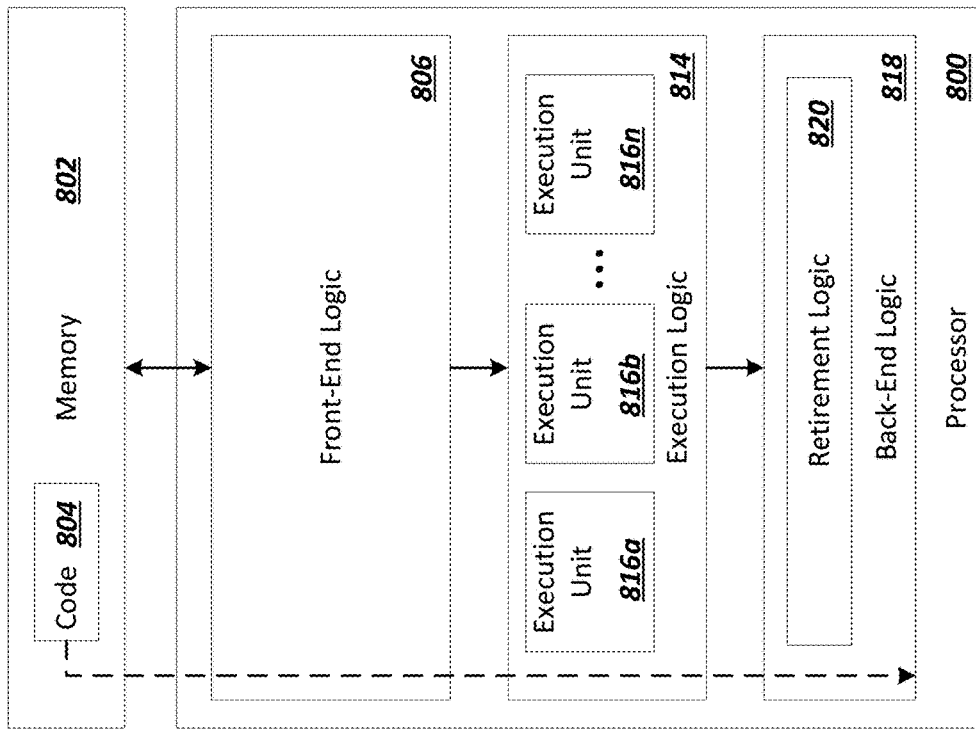
FIG. 8 depicts a processor according to exemplary aspects.
Figure 9:
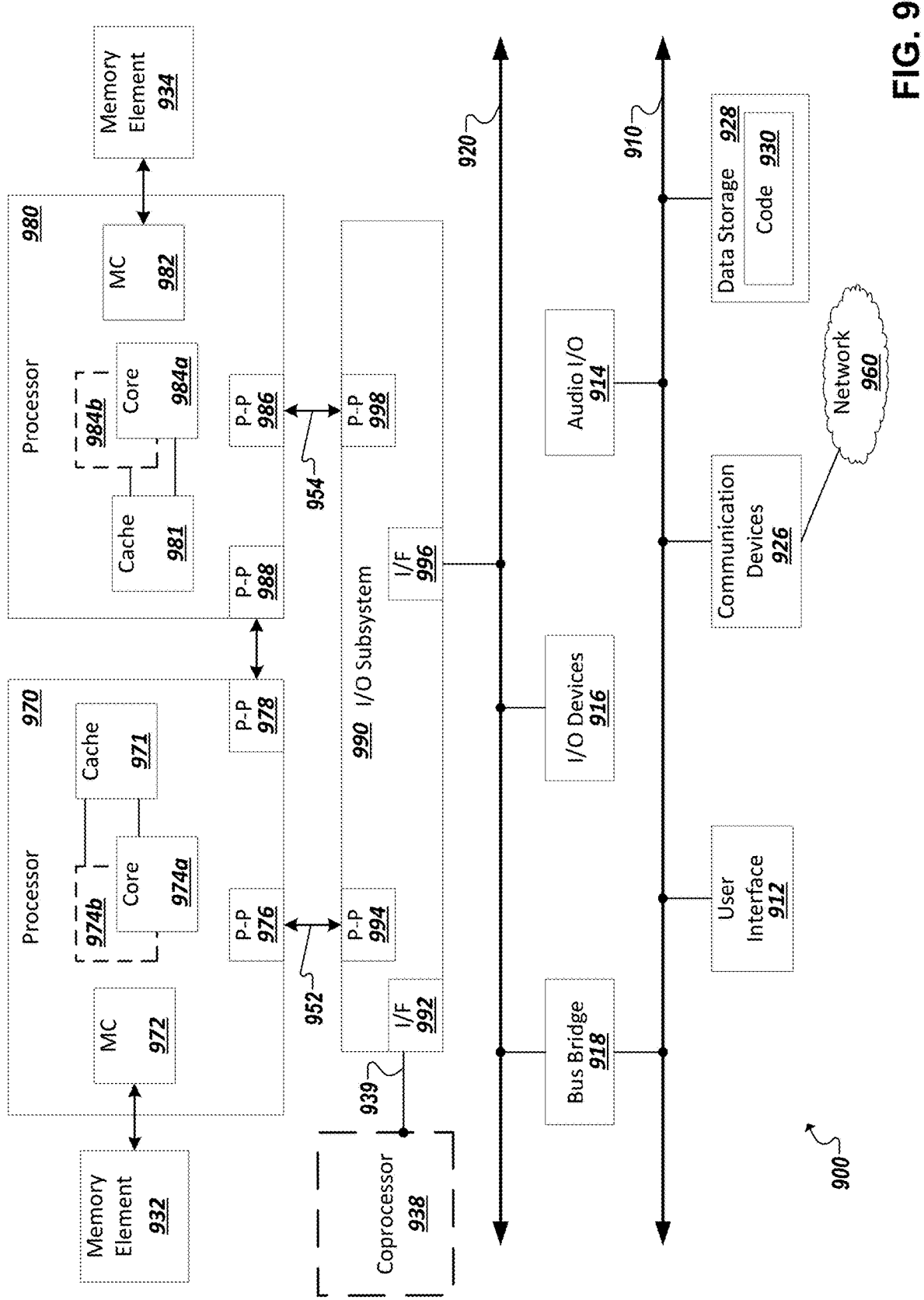
FIG. 9 depicts a computing system arranged in a point-to-point (PtP) configuration according to exemplary aspects. Like reference numbers and designations in the various drawings indicate like elements.

FIG. 8 depicts a processor in accordance with certain aspects and FIG. 9 depicts a computing system arranged in a point-to-point (PtP) configuration in accordance with certain aspects. FIGS. 8-9 are block diagrams of exemplary computer architectures that may be used in accordance with aspects disclosed herein (e.g., all or a portion of these architectures may be implemented to provide a processor comprising processor cores that may execute workload instances and an interrupt controller that redirect interrupts to leading processor cores). Other computer architecture designs known in the art for processors and computing systems may also be used. Generally, suitable computer architectures for aspects disclosed herein can include, but are not limited to, configurations illustrated in FIGS. 8-9.

FIG. 8 is an example illustration of a processor according to an aspect. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one aspect, the processor 800 may be multi-threaded in that it may include more than one hardware thread context (or "logical processor") per core.

FIG. 8 also illustrates a memory 802 coupled to processor 800 in accordance with an aspect. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some aspects may include a number of execution units dedicated to specific functions or sets of functions. Other aspects may include only one execution unit or one execution unit that can perform a particular function. Execution logic 814 performs the operations specified by code instructions.

After completion of execution of the operations specified by the code instructions, back-end logic 818 can retire the instructions of code 804. In one aspect, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some aspects, non-volatile memory (such as flash memory or fuses) may also be included on the chip with processor 800.

FIG. 9 illustrates a computing system 900 that is arranged in a point-to-point (PtP) configuration according to an aspect. In particular, FIG. 9 shows a system where processors, memory, and input/output devices are interconnected by a number of point-to-point interfaces. Generally, one or more of the computing systems described herein may be configured in the same or similar manner as computing system 800.

Processors 970 and 980 may also each include integrated memory controller logic (MC) 972 and 982 to communicate with memory elements 932 and 934. In alternative aspects, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a co-processor 938, such as a high-performance graphics circuit, machine learning accelerator, or other co-processor 938, via an interface 939, which could be a PtP interface circuit. In alternative aspects, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative aspects, any portions of the bus architectures could be implemented with one or more PtP links.

The computer system depicted in FIG. 9 is a schematic illustration of an aspect of a computing system that may be utilized to implement various aspects discussed herein. It will be appreciated that various components of the system depicted in FIG. 9 may be combined in a system-on-a-chip (SoC) architecture or in any other suitable configuration capable of achieving the functionality and features of examples and implementations provided herein.

Examples

Example 1 includes an apparatus comprising a first processor core to execute a first instance of an application; a second processor core to execute a second instance of the application concurrent with the execution of the first instance of the application; and processing circuitry to direct an interrupt to the first processor core based on an indication that an execution state of the first processor core is ahead of an execution state of the second processor core.

Example 2 includes the apparatus of Example 1, the processing circuitry comprising an interrupt controller to initially select the second processor core to process the interrupt and to override the selection and instead direct the interrupt to the first processor core based on the indication that the execution state of the first processor core is ahead of the execution state of the second processor core.

Example 3 includes the apparatus of any of Examples 1-2, wherein the indication that the execution state of the first processor core is ahead of the execution state of the second processor core is based on a determination that an execution state of the first instance of the application is ahead of the execution state of the second instance of the application.

Example 4 includes the apparatus of Example 3, wherein the indication that the execution state of the first processor core is ahead of the execution state of the second processor core is further based on a determination that an execution state of a first instance of a second application executed by the first processor core is ahead of the execution state of a second instance of the second application concurrently executed by the second processor core.

Example 5 includes the apparatus of any of Examples 1-4, the first processor core to periodically generate snapshots of an execution state of the first instance of the application and the second core to periodically generate snapshots of an execution state of the second instance of the application, each snapshot to include a timestamp and a snapshot identifier, wherein the indication that the execution state of the first processor core is ahead of an execution state of the second processor core is based on comparison of respective timestamps of the first instance and second instance of the application for snapshots that include the same snapshot identifier.

Example 6 includes the apparatus of any of Examples 1-5, the processing circuitry to store an indication of one or more leading processor cores, wherein the indication that the execution state of the first processor core is ahead of the execution state of the second processor core is based on the second processing core not being included within the indication of one or more leading processor cores.

Example 7 includes the apparatus of Example 6, the processing circuitry further to store an indication that interrupt redirection to the one or more leading processor cores is enabled.

Example 8 includes the apparatus of any of Examples 6-7, the processing circuitry further to store respective weights for the one or more leading processor cores, the weights defining a relative frequency with which each leading processor core is to receive interrupts redirected from one or more lagging processor cores.

Example 9 includes the apparatus of Example 8, wherein the weights are based on magnitudes of execution drifts of each leading processor core.

Example 10 includes the apparatus of any of Examples 8-9, wherein the weights are specified by an entity to which execution drifts of the one or more leading processor cores are reported.

Example 11 includes at least one non-transitory machine readable storage medium having instructions stored thereon, the instructions when executed by a machine to cause the machine to execute, by a first processor core, a first instance of an application; execute, by a second processor core, a second instance of the application concurrently with the execution of the first instance of the application; and direct an interrupt to the first processor core based on an indication that an execution state of the first processor core is ahead of an execution state of the second processor core.

Example 12 includes the medium of Example 11, the instructions when executed by the machine to cause the machine to initially select the second processor core to process the interrupt and to override the selection and instead direct the interrupt to the first processor core based on the indication that the execution state of the first processor core is ahead of the execution state of the second processor core.

Example 13 includes the medium of any of Examples 11-12, wherein the indication that the execution state of the first processor core is ahead of the execution state of the second processor core is based on a determination that an execution state of the first instance of the application is ahead of the execution state of the second instance of the application.

Example 14 includes the medium of Example 13, wherein the indication that the execution state of the first processor core is ahead of the execution state of the second processor core is further based on a determination that an execution state of a first instance of a second application executed by the first processor core is ahead of the execution state of a second instance of the second application concurrently executed by the second processor core.

Example 15 includes the medium of any of Examples 11-14, the instructions when executed by the machine to cause the machine to cause the first processor core to periodically generate snapshots of an execution state of the first instance of the application and to cause the second processor core to periodically generate snapshots of an execution state of the second instance of the application, each snapshot to include a timestamp and a snapshot identifier, wherein the indication that the execution state of the first processor core is ahead of an execution state of the second processor core is based on comparison of respective timestamps of the first instance and second instance of the application for snapshots that include the same snapshot identifier.

Example 16 includes a method comprising executing, by a first processor core, a first instance of an application; executing, by a second processor core, a second instance of the application concurrently with the execution of the first instance of the application; and directing an interrupt to the first processor core based on an indication that an execution state of the first processor core is ahead of an execution state of the second processor core.

Example 17 includes the method of Example 16, further comprising initially selecting the second processor core to process the interrupt and overriding the selection and instead directing the interrupt to the first processor core based on the indication that the execution state of the first processor core is ahead of the execution state of the second processor core.

Example 18 includes the method of any of Examples 16-17, wherein the indication that the execution state of the first processor core is ahead of the execution state of the second processor core is based on a determination that an execution state of the first instance of the application is ahead of the execution state of the second instance of the application.

Example 19 includes the method of Example 18, wherein the indication that the execution state of the first processor core is ahead of the execution state of the second processor core is further based on a determination that an execution state of a first instance of a second application executed by the first processor core is ahead of the execution state of a second instance of the second application concurrently executed by the second processor core.

Example 20 includes the method of any of Examples 16-19, further comprising periodically generating snapshots of an execution state of the first instance of the application and periodically generating snapshots of an execution state of the second instance of the application, each snapshot to include a timestamp and a snapshot identifier, wherein the indication that the execution state of the first processor core is ahead of an execution state of the second processor core is based on comparison of respective timestamps of the first instance and second instance of the application for snapshots that include the same snapshot identifier.

Example 21 is a non-transitory computer-readable storage medium with an executable computer program stored thereon, the program instructing a processor to perform the method of any of Examples 16-20.

Example 22 is a computer program product having a computer program which is directly loadable into a memory of a controller, when executed by the controller, causes the controller to perform the method of any of Examples 16-20.

Example 23 is an apparatus as shown and described.

Example 24 is a method as shown and described.

Example 25 is a non-transitory computer-readable storage medium with an executable computer program stored thereon, the program instructing a processor to perform the method as shown and described.

Example 26 is a computer program product having a computer program which is directly loadable into a memory of a controller, when executed by the controller, causes the controller to perform the method as shown and described.

It should be appreciated that the examples presented above are non-limiting examples provided merely for purposes of illustrating certain principles and features and not necessarily limiting or constraining the potential aspects of the concepts described herein. For instance, a variety of different aspects can be realized utilizing various combinations of the features and components described herein, including combinations realized through the various implementations of components described herein. Other implementations, features, and details should be appreciated from the contents of this Specification.

Conclusion

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The aspects of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform aspects of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," "processor circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, as described herein, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others. A processor or a controller can be "hard-coded" with instructions to perform corresponding function(s) according to aspects described herein. Alternatively, the processor or controller can access an internal and/or external memory to retrieve instructions stored in the memory, which when executed by the processor/controller, perform the corresponding function(s) associated with the processor/controller, and/or one or more functions and/or operations related to the operation of a component having the processor/controller included therein.

As used herein, "memory" is understood as a computer-readable medium in which data or information can be stored for retrieval. References to "memory" included herein may thus be understood as referring to volatile or non-volatile memory, including: random access memory (RAM), such as static RAM (SRAM) or dynamic RAM (DRAM); read-only memory (ROM); flash memory; solid-state storage; magnetic or optical storage medium; hard disk drive; optical drives; machine-readable medium that may include any mechanism for storing or transmitting information in a form readable by a machine (e.g., a computer); or any combination thereof. Registers, shift registers, processor registers, data buffers, among others, are also embraced herein by the term memory. The term "software" refers to any type of executable instruction, including firmware.

Instructions used to program logic to perform aspects of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one aspect, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one aspect, refer to a default and an updated value or state, respectively. For example, a default value potentially includes a high logical value, i.e. reset, while an updated value potentially includes a low logical value, i.e. set. Note that any combination of values may be utilized to represent any number of states.

A module or engine as used herein may refer to circuitry and any combination of hardware, software, and/or firmware. As an example, a module includes hardware, such as a micro-controller, associated with a non-transitory medium to store code adapted to be executed by the micro-controller. Therefore, reference to a module, in one aspect, refers to the hardware, which is specifically configured to recognize and/or execute the code to be held on a non-transitory medium. Furthermore, in another aspect, use of a module refers to the non-transitory medium including the code, which is specifically adapted to be executed by the microcontroller to perform predetermined operations. And as can be inferred, in yet another aspect, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one aspect, use of the term logic includes hardware, such as transistors, registers, or other hardware, such as programmable logic devices.

Logic may be used to implement any of the flows described or functionality of the various components such as any of the components or subcomponents of FIGS. 1-9. "Logic" may refer to hardware, firmware, software and/or combinations of each to perform one or more functions. In various aspects, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some aspects, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one aspect, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one aspect, refers to some apparatus, logic, hardware, and/or element designed in such a way to enable use of the apparatus, logic, hardware, and/or element in a specified manner. Note as above that use of to, capable to, or operable to, in one aspect, refers to the latent state of an apparatus, logic, hardware, and/or element, where the apparatus, logic, hardware, and/or element is not operating but is designed in such a manner to enable use of an apparatus in a specified manner.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" or "automated vehicle" may describe a vehicle capable of implementing at least one navigational change without driver input, including a vehicle that implements all or substantially all navigational changes, at least during some (significant) part (spatial or temporal, e.g., in certain areas, or when ambient conditions are fair, or on highways, or above or below a certain speed) of some drives. An "autonomous vehicle" may be distinguished from a "partially autonomous vehicle" or a "semi-autonomous vehicle" that is capable of implementing some (but not all) navigational changes, possibly at certain times, under certain conditions, or in certain areas.

A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time varying features or data).

Various aspects herein may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The invention claimed is:

1. An apparatus comprising:
    a first processor core configured to execute a first instance of an application;
    a second processor core configured to execute a second instance of the application concurrent with the execution of the first instance of the application by the first processor core,
    wherein the first processor core and the second processor core are part of the same system on a chip (SoC) and form a workload pair that independently execute the first instance of the application and the second instance of the application, the second instance of the application comprising a duplication of the first instance of the application; and
    processing circuitry configured to direct an interrupt to the first processor core based on an indication that an execution state of the first processor core is ahead of an execution state of the second processor core to thereby assign processing of the interrupt to a leading processing core from among the first processor core and the second processor core, wherein the processing circuitry is configured to store an indication of one or more leading processor cores, and wherein the processing circuitry is further configured to store respective weights for one or more leading processor cores, the weights defining a relative frequency with which each of the one or more leading processor cores is to receive interrupts redirected from one or more lagging processor cores.

2. The apparatus of claim 1, wherein the processing circuitry comprises an interrupt controller configured to initially select the second processor core to process the interrupt and to override the selection by directing the interrupt to the first processor core based on the indication that the execution state of the first processor core is ahead of the execution state of the second processor core.

3. The apparatus of claim 1, wherein the indication that the execution state of the first processor core is ahead of the execution state of the second processor core is based on a determination that an execution state of the first instance of the application is ahead of an execution state of the second instance of the application.

4. The apparatus of claim 3, wherein the indication that the execution state of the first processor core is ahead of the execution state of the second processor core is further based on a determination that an execution state of a first instance of a second application executed by the first processor core is ahead of an execution state of a second instance of the second application concurrently executed by the second processor core.

5. The apparatus of claim 1, wherein:
the first processor core is configured to periodically generate snapshots of an execution state of the first instance of the application,
the second core is configured to periodically generate snapshots of an execution state of the second instance of the application,
each snapshot includes a timestamp and a snapshot identifier,
the indication that the execution state of the first processor core is ahead of the execution state of the second processor core is based on a comparison of respective timestamps of the first instance and the second instance of the application for snapshots that include the same snapshot identifier.

6. The apparatus of claim 1, wherein the processing circuitry is configured to store an indication of one or more leading processor cores, and
wherein the indication that the execution state of the first processor core is ahead of the execution state of the second processor core is based on the second processing core being excluded from the indication of the one or more leading processor cores.

7. The apparatus of claim 1, wherein the processing circuitry is further configured to store an indication that interrupt redirection to the one or more leading processor cores is enabled.

8. The apparatus of claim 1, wherein the weights are based on magnitudes of execution drifts of each leading processor core.

9. The apparatus of claim 1, wherein the weights are specified by an entity to which execution drifts of the one or more leading processor cores are reported.

10. At least one non-transitory machine readable storage medium having instructions stored thereon, the instructions, when executed by a machine, cause the machine to:
execute, by a first processor core, a first instance of an application;
execute, by a second processor core, a second instance of the application concurrently with the execution of the first instance of the application by the first processor core,
wherein the first processor core and the second processor core are part of the same system on a chip (SoC) and form a workload pair that independently execute the first instance of the application and the second instance of the application, the second instance of the application comprising a duplication of the first instance of the application;
direct an interrupt to the first processor core based on an indication that an execution state of the first processor core is ahead of an execution state of the second processor core to thereby assign processing of the interrupt to a leading processing core from among the first processor core and the second processor core;
store an indication of one or more leading processor cores; and
store respective weights for one or more leading processor cores, the weights defining a relative frequency with which each of the one or more leading processor cores is to receive interrupts redirected from one or more lagging processor cores.

11. The medium of claim 10, wherein the instructions, when executed by the machine, cause the machine to initially select the second processor core to process the interrupt and to override the selection by directing the interrupt to the first processor core based on the indication that the execution state of the first processor core is ahead of the execution state of the second processor core.

12. The medium of claim 10, wherein the indication that the execution state of the first processor core is ahead of the execution state of the second processor core is based on a determination that an execution state of the first instance of the application is ahead of an execution state of the second instance of the application.

13. The medium of claim 12, wherein the indication that the execution state of the first processor core is ahead of the execution state of the second processor core is further based on a determination that an execution state of a first instance of a second application executed by the first processor core is ahead of an execution state of a second instance of the second application concurrently executed by the second processor core.

14. The medium of claim 10, wherein the instructions, when executed by the machine, cause the machine to:
cause the first processor core to periodically generate snapshots of an execution state of the first instance of the application,
cause the second processor core to periodically generate snapshots of an execution state of the second instance of the application,
wherein each snapshot includes a timestamp and a snapshot identifier, and
wherein the indication that the execution state of the first processor core is ahead of the execution state of the second processor core is based on comparison of respective timestamps of the first instance and the second instance of the application for snapshots that include the same snapshot identifier.

15. A method comprising:
executing, by a first processor core, a first instance of an application;
executing, by a second processor core, a second instance of the application concurrently with the execution of the first instance of the application by the first processor core,
wherein the first processor core and the second processor core are part of the same system on a chip (SoC) and form a workload pair that independently execute the first instance of the application and the second instance of the application, the second instance of the application comprising a duplication of the first instance of the application;
directing an interrupt to the first processor core based on an indication that an execution state of the first processor core is ahead of an execution state of the second processor core to thereby assign processing of the interrupt to a leading processing core from among the first processor core and the second processor core;
storing an indication of one or more leading processor cores; and
storing respective weights for one or more leading processor cores, the weights defining a relative frequency with which each of the one or more leading processor cores is to receive interrupts redirected from one or more lagging processor cores.

16. The method of claim 15, further comprising:
initially selecting the second processor core to process the interrupt and override the selection by directing the interrupt to the first processor core based on the indication that the execution state of the first processor core is ahead of the execution state of the second processor core.

17. The method of claim 15, wherein the indication that the execution state of the first processor core is ahead of the execution state of the second processor core is based on a determination that an execution state of the first instance of the application is ahead of an execution state of the second instance of the application.

18. The method of claim 17, wherein the indication that the execution state of the first processor core is ahead of the execution state of the second processor core is further based on a determination that an execution state of a first instance of a second application executed by the first processor core is ahead of an execution state of a second instance of the second application concurrently executed by the second processor core.

19. The method of claim 15, further comprising:
periodically generating snapshots of an execution state of the first instance of the application; and
periodically generating snapshots of an execution state of the second instance of the application,
wherein each snapshot includes a timestamp and a snapshot identifier, and
wherein the indication that the execution state of the first processor core is ahead of the execution state of the second processor core is based on comparison of respective timestamps of the first instance and the second instance of the application for snapshots that include the same snapshot identifier.

20. The apparatus of claim 1, wherein the processing circuitry is further configured to store an indication that interrupt redirection to the one or more leading processor cores is enabled.

21. The apparatus of claim 1, wherein the weights are (i) based on magnitudes of execution drifts of each leading processor core, or (ii) specified by an entity to which execution drifts of the one or more leading processor cores are reported.

* * * * *